May 13, 1941.　　　B. L. BEALS, JR　　　2,241,577

FLYING AUTOMOBILE

Filed June 23, 1939　　　9 Sheets-Sheet 1

INVENTOR
B. L. Beals, Jr.
BY
Morgan Finnegan & Durham
ATTORNEYS

May 13, 1941.  B. L. BEALS, JR  2,241,577
FLYING AUTOMOBILE
Filed June 23, 1939  9 Sheets-Sheet 2

INVENTOR
B. L. Beals, Jr.
BY
Morgan Finnegan & Durham
ATTORNEYS

May 13, 1941. B. L. BEALS, JR 2,241,577
FLYING AUTOMOBILE
Filed June 23, 1939 9 Sheets-Sheet 4

Fig. 9.

INVENTOR
B. L. Beals, Jr.
BY
Morgan Finnegan & Durham
ATTORNEYS

May 13, 1941.  B. L. BEALS, JR  2,241,577
FLYING AUTOMOBILE
Filed June 23, 1939  9 Sheets-Sheet 6

INVENTOR
B. L. Beals, Jr.
BY Morgan Finnegan & Durham
ATTORNEYS

May 13, 1941.  B. L. BEALS, JR  2,241,577
FLYING AUTOMOBILE
Filed June 23, 1939  9 Sheets-Sheet 7

INVENTOR
B. L. Beals, Jr.
BY
Morgan, Finnegan & Durham
ATTORNEYS

May 13, 1941.  B. L. BEALS, JR  2,241,577
FLYING AUTOMOBILE
Filed June 23, 1939  9 Sheets-Sheet 9

INVENTOR
B. L. Beals, Jr.
BY
Morgan Finnegan + Durham
ATTORNEYS

Patented May 13, 1941

2,241,577

UNITED STATES PATENT OFFICE 2,241,577

FLYING AUTOMOBILE

Bruce L. Beals, Jr., Hempstead, N. Y., assignor to Flying Car Corporation, Trenton, N. J., a corporation of New Jersey Application June 23, 1939, Serial No. 280,774

11 Claims. (Cl. 244—49)

The invention relates to automotive vehicles and more particularly to a novel and useful vehicle adapted for land and air travel.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

The invention is directed to providing an improved automotive vehicle primarily designed for land travel and conforming so far as possible to conventional automobile construction and design, but adapted to function as an airplane with a minimum of additional equipment and mechanical and structural modification. So far as possible the standard or conventional power and control elements of the automobile construction are adapted for use in propelling and controlling the vehicle in flight, requiring substantially no additional control elements, each part of the automobile control mechanism being adapted to perform multiple services, depending upon whether the vehicle is to be controlled for land travel or in flight.

A primary object of the invention is to provide a land vehicle capacitated to operate as a primary independent and self-contained unit, but which may be rendered capable of flight by simply attaching thereto a few additional flight-sustaining and controlling members. Accordingly the invention provides a motor car to which may be simply and securely attached surfaces for sustaining, propelling and guiding the vehicle through the air. Said flight-sustaining and guiding surfaces or members are preferably designed, so far as possible, to constitute a small number, and preferably a single unit which may be very quickly attached and detached to the automobile, but which when attached constitutes a structurally secure and integrated element of the flying machine. The flight-sustaining and guiding unit is preferably designed so as to be interchangeable with like units, so that the owner of the motor car may drive up to a flight service center, attach the flying unit to his car, take off and fly to another landing field where the flying unit may be detached and used on another vehicle of similar design. Thus the motor car is designed for permanent private ownership, but adapted for occasional flight whenever the owner wishes, the flying parts or flying unit being preferably handled and serviced by those skilled in such work.

As stated, the invention provides for economy in design and certainty and security of operation by utilizing the automobile control mechanism, so far as possible, to also control the operation of the vehicle in flight. Likewise the power unit or motor of the automobile is capacitated to supply the motive power for flight, and the weight, weight distribution and surface design of the car are all calculated to give it suitable aerial qualities when combined with the flying unit devices attachable thereto.

More in detail, the steering mechanism of the automobile is adapted to be disconnected from the dirigible land wheels and to be connected to suitable control elements of the flying unit, such as the ailerons and elevator for control of the vehicle in flight. Similarly the clutch and brake pedals of the automobile may be utilized in flight to control the operation of the vertical rudder or other flight guiding surface. The wheels of the automobile are adapted for use as landing wheels in taking off and landing of the vehicle for flight and are accordingly designed with suitable shock absorbing devices, which are combined with the steering and power transmission mechanisms in a novel and efficient manner.

The invention further comprises suitable safety elements to insure that the vehicle will operate correctly and safely as to proper co-ordination of all the necessary control features. Thus when the flying unit elements are attached, safety interlock means are provided to insure that the vehicle cannot be started in operation for flight until the steering mechanism is properly linked to control the ailerons and other flight-control means of the aircraft. Similarly the safety interlock means are designed to require complete linkage of the automobile driving and steering mechanisms before the vehicle can resume its operation as a land vehicle.

One important application of the invention is in military operations, where the vehicle may be utilized to transport troops rapidly and flexibly from point to point by air and thence along the ground. Thus troops may be rapidly and safely flown to a scene of action, land and proceed on ground in the automobile, which for such uses will be suitably armored and armed. The invention thus lends itself to extension of the mobility desired in mechanized cavalry operations, and also in facilitating reconnaissance work in the field.

Figure 1:
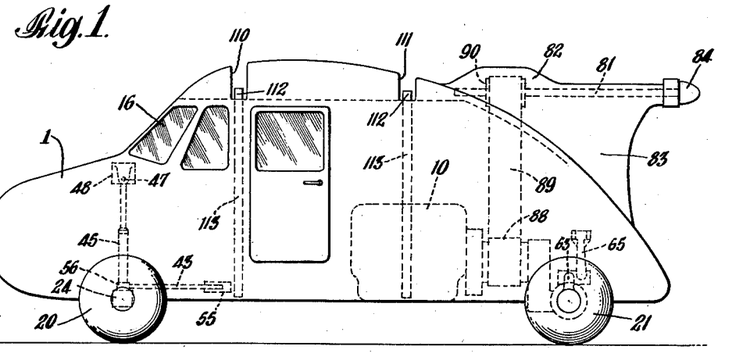
Fig. 1 is a side elevation of a motor car embodying the invention and adapted for land travel.
Figure 4:
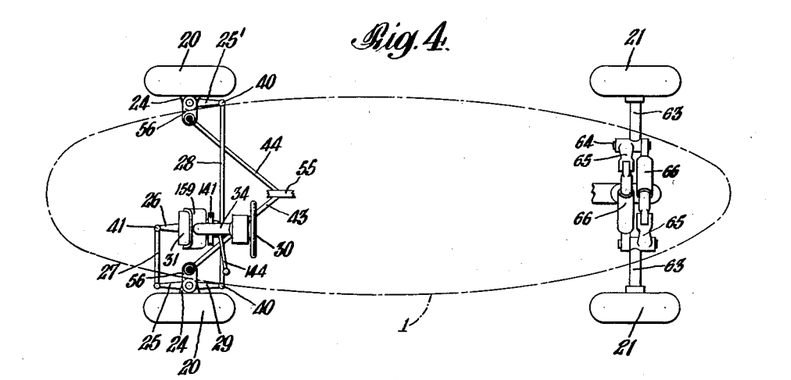
Fig. 4 is a fragmentary plan of the steering and shock absorbing system of the motor car with the body shown in diagrammatic outline.
Figure 5:
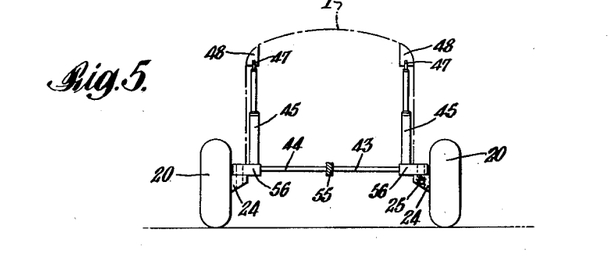
Fig. 5 is a cross section of the forward part of the mechanism shown in Fig. 4 showing the front wheels and shock absorbing unit.
Figure 6:
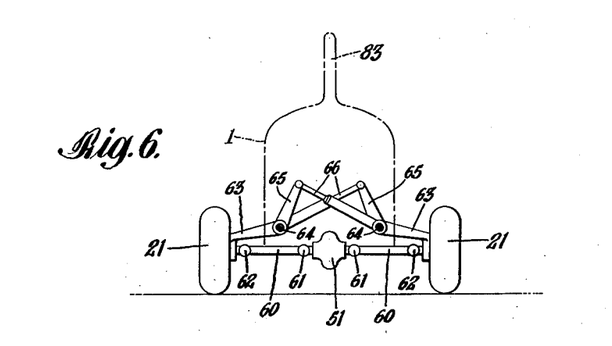
Fig. 6 is a similar view of the rear wheels showing the shock absorbing unit and rear wheel drive mounting.

Referring now in detail to the present preferred embodiment of the invention the vehicle is designed to function primarily as an automobile of substantially standard construction. As shown, the motor car unit comprises a streamline body 1 which departs as little as possible from the more modern forms of automobile bodies. The body is designed in shape and weight to operate as the fuselage and motor housing for the vehicle in flight and as shown the body in plan is relatively long and narrow (Figs. 1 and 4). An internal combustion motor 10 of suitable lightness and power is preferably mounted near the rear of the vehicle for purposes of proper weight distribution and also to facilitate transmission of power to the land and air propelling units. A seat 15 for driver and one or two passengers is provided near the front of the vehicle where the steering mechanism, control panel and windshield 16 are also located.

The vehicle is preferably provided with four supporting wheels, the two front wheels 20 being dirigible for steering and the two rear wheels 21 being connected to the motor by suitable transmission gearing, in accordance with conventional automobile practice. It will be understood, however, that the invention in its broader aspects is not limited to a four-wheeled vehicle and that known or suitable three-wheel or other arrangements may be provided if desired.

Figure 8:
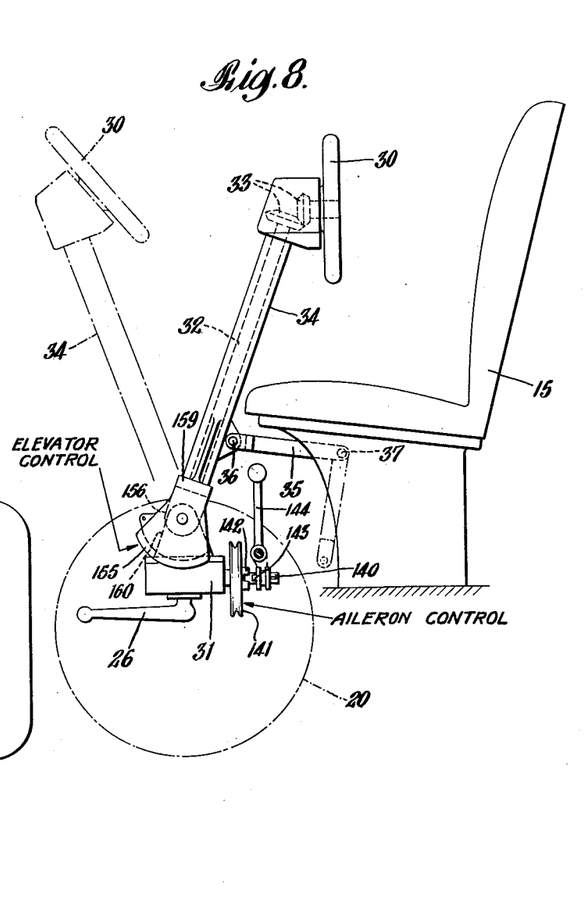
Fig. 8 is a fragmentary side elevation of the steering mechanism and mounting of the steering wheel and column with respect to the driving seat.

Referring now to the present preferred steering means for the four-wheeled automobile vehicle, the left front wheel 20 is rotatably mounted on the outer end of a bell crank formed on the wheel hub 24 and having a forwardly extending arm 25. Means to turn the left wheel about a vertical axis for steering comprises a horizontally rotatable parallel steering crank 26 and a pivotally interconnected cross link 27. Corresponding turning movement is transmitted to the right hand front wheel 20 by a cross link 28 which connects the bell crank 25 to a similar rearwardly extending bell crank arm 25' on the right front wheel 20 by means of a rearward extension 29 of the bell crank 25. A steering wheel 30 is positioned in front of the driving seat 15 and adapted to transmit steering movement to the crank 26 through a conventional steering gear 31 and an upstanding rotatable shaft 32 which is suitably connected by bevelled gearing 33 to the steering wheel. The rotatable shaft 32 is suitably housed in a hollow steering column 34 which is normally inclined rearwardly, as shown in Fig. 8, for automobile driving. Means for holding the steering column 34 and wheel 30 in the rearwardly inclined position comprise a locking arm 35 removably bolted at 36 to a bracket fixed to the steering column 34. The opposite end of the arm 35 is connected to the frame of the vehicle body as at point 37 under the seat.

Combined with the wheel steering mechanism are suitable shock absorber means for permitting the vehicle in flight to land upon the dirigible wheels 20 without harm to the steering mechanism. As embodied, the cross links 27 and 28 are connected to the steering links 25 by suitable universal joints 40 and a similar universal joint 41 forms the pivotal connection between steering arm 26 and the inner end of links 27. Suitable tie rods 43 and 44 extend diagonally from a central frame member 55 to the inner ends of pivotal arms 56 which extend from the hubs 24. The connections between the ends of arms 56 and the rods 43 and 44 are universal joints and similar connections (not shown) are provided at the frame member 55. Thus the entire steering mechanism is adapted to permit vertical pivotal movement upon a vertical shock absorbing movement of either wheel, without harm to or displacement of any parts or connections of the steering mechanism. The two front wheels 20 are independently sprung by means of hydraulic shock absorbers 45 which extend vertically upwardly and are rigidly connected at 56 to the wheel hub 24. The upper ends of the shock absorbers are connected at 47 to rigid frame members 48 of the vehicle body structure. It will be understood that other shock absorbing and steering systems may be provided, the principal object being to permit adequate land steering and also to enable the wheels to have a shock-absorbing movement substantially greater than that required for ordinary automobile use and approximating the shock-absorbing action of airplane landing wheels. It will be understood that other forms of shock absorbers, such as spring or rubber cord or pneumatic systems may be used as found preferable or desirable.

Figure 16:
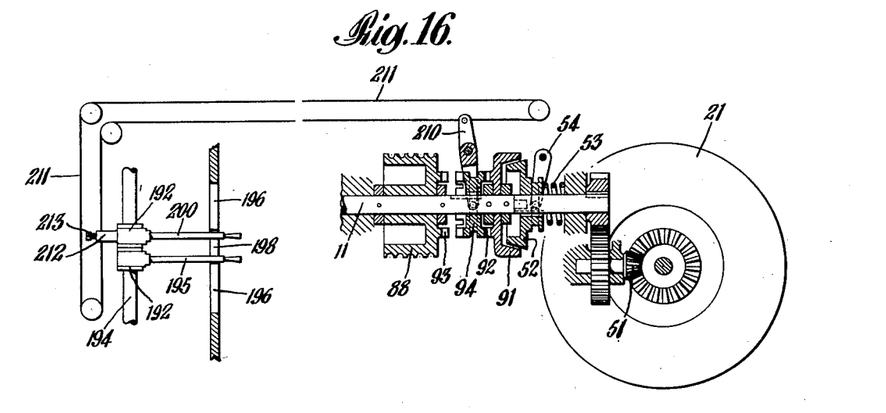
Fig. 16 is a diagrammatic view of the interlock between the rudder mechanism and the motor connection between the wheels and propeller, the left hand portion being in plan and the right hand portion in vertical side section.

Referring now to the embodied means for transmitting power to the rear wheels 21 of the vehicle, power is transmitted from the motor 10 to the rear wheels through a suitable conventional gear shifting transmission (not shown) to a differential 51 located in rear of motor 10 and midway between the rear wheels 21 (Fig. 16). A suitable friction clutch 52 normally engaged by a spring 53 is adapted to transmit power to the differential gearing under control of the driver, a control member 54 being indicated, but the connections therefrom to the clutch pedal 55 being not shown. As stated, suitable gear changing transmission means of any known or conventional type may be located between the clutch 52 and the differential drive 51. It will be understood that the clutching, gear changing and transmission means between the motor shaft 11 and the rear wheel differential drive constitute no essential part of the invention and for that reason are shown largely diagrammatically and may be of any suitable or desired construction.

The rear wheel drive is adapted for shock-absorbing movement whereby the rear wheels 21 may also act as landing wheels for the vehicle in flight. As embodied, power is transmitted from the differential gearing 51 to the wheels 21 through driven axles 60 both of which are provided with universal joints 61 adjacent the differential housing and also with universal joints 62 adjacent the wheel hub. Thus the wheels are adapted to have considerable free vertical movement which does not interfere with the transmission of power to the rear wheels when the vehicle is being operated on the land. Suitable shock-absorbing means are designed for controlling said vertical movement of the rear wheels. As embodied, a bell crank is provided for either rear wheel, the outer arm 63 of the bell crank being rigidly connected to the wheel hub. The bell crank is pivotally mounted at 64 on a fixed member of the automobile frame so that the inner arm 65 of the bell crank extends upwardly and slightly inwardly. A suitable hydraulic or other design of shock absorber 66 is connected at one end to the movable bell crank arm 65 and at its other end to the opposite fixed frame member 64. The opposing wheel is similarly provided with bell crank and shock absorber so that the two shock absorbers are disposed diagonally with respect to each other and sufficiently spaced to permit free independent action. Thus upward rocking movement of either rear wheel 21 will cause the arm 65 of its bell crank to swing inwardly and downwardly and compress the shock absorber attached thereto.

The automotive vehicle is provided with suitable means located at the driving position for controlling the operation of the driving clutch 52 and of the wheel brakes (not shown). As embodied, said means comprise substantially conventional clutch pedal 55 and brake pedal 70, both located in conventional relation for operation by the feet of the driver. Both pedals are rotatably mounted on a stationary cross shaft 71, which for convenience of illustration is shown above the floor board 72, although in practice it and the other devices connected to the pedals may be positioned below the floor board. The brake pedal is operatively connected with a suitable brake-controlling rod 73 by means of a bell crank 74 rotatably mounted on the shaft 71. For linking the brake pedal to the brake-actuating rod 73 a pin 75 is slidably mounted in the upper end 76 of the brake pedal frame and is adapted to slide into a suitable bore 77 in the bell crank. Similar means are provided for operatively connecting the clutch pedal 55 to a bell crank 78 for operating a clutch control rod 79. It will be understood however that the clutch and brake mechanisms may be provided with electrical, vacuum or other power means in lieu of the mechanical connections shown.

In accordance with the invention the generally conventional automobile structure and mechanism hereinbefore described is adapted to be supplied with additional elements which will enable it to operate as an airplane. Said elements broadly comprise propelling means, flight-sustaining means and control devices for operating the unit in flight. Referring first to the flight-propelling means, same comprise a conventional air propeller 80 mounted and adapted to be driven by the automobile motor 10. As embodied, a propeller shaft 81 is supported in a suitable bearing box 82 mounted above and just to the rear of motor 10 at the top of the automobile body and supported by suitable rigid connections with the automobile frame. A suitable supporting plate or fin 83 is permanently formed as part of the automobile body and extends upwardly and rearwardly from the rear sloping surface thereof, along the center line of the vehicle. The propeller shaft 81 is housed in and extends through the upper portion of said fin 83.

The propeller 80 is of the pusher type and may be permanently connected to the end of the shaft 81 by a locking hub 84, so as to travel with the automobile on the land. In such case suitable means, not shown, will be provided for preventing free rotation of the propeller during land travel of the automobile. Preferably, however, the propeller is removable and may be attached and held in place on the end of the shaft 81 by means of the hub 84 at such times that it is desired to fly. While the construction and mounting of the propeller are preferably shown as of the pusher type, positioned at the rear of the vehicle, it will be understood that the invention is not necessarily limited thereto, but may be designed to operate with one or more tractor propellers mounted at the front of the vehicle. However, it has been found that the location of the pusher propeller conforms most readily to the present general design of automobiles.

The embodied means for transmitting power to the propeller shaft 81 from the motor shaft comprises a grooved pulley 88 mounted to rotate with the motor shaft 11 and disposed forwardly of the clutch 52 and other mechanism for transmitting power to the vehicle wheels. A set of V belts 89 are reeved about the pulley 88 and over a similar pulley 90 positioned directly thereabove on the propeller shaft 81. Means are provided for disconnecting the motor drive from the wheel transmission and transferring same to the propeller pulley 88 and vice versa, depending upon whether it is desired to drive the rear wheels or the propeller. As embodied, the fixed member 91 of the friction clutch 52 and the rear face of the pulley 88 are provided with clutch teeth 92 and 93 respectively. A dual-faced clutch-engaging disc 94 is positioned between the toothed faces 92 and 93 and is splined to the shaft 11.

By suitable translatory movement of the disc 94, either the clutch member 91 or the pulley 88 may be engaged to rotate positively with the shaft 11, thereby to transmit power either to the rear wheels 21 or the propeller shaft 81.

It will be understood that any desired driving ratio between the motor shaft 11 and the propeller shaft 81 may be provided by the relative size relation of the pulleys 88 and 90. The invention is not limited, however, to a belt and pulley drive between the motor and propeller shaft, but any suitable power transmission means, involving positive gear connections or the like may be substituted.

Figure 2:
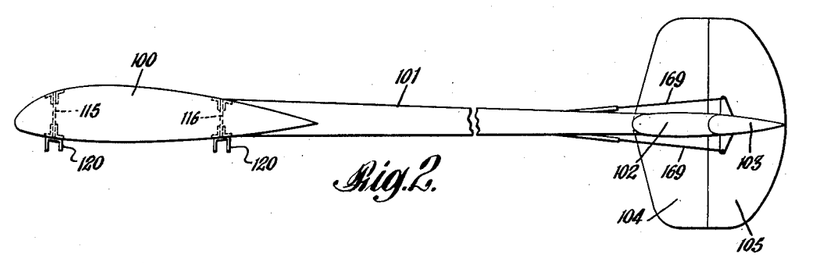
Fig. 2 is a side elevation of a flight unit adapted to be attached to the car shown in Fig. 1.

Referring now to the embodied means for supporting and sustaining the vehicle in flight, same preferably comprises a unitary wing and tail unit, hereinafter called the "flight unit," generally shown in Figs. 2 and 10. Said unit is adapted to be mounted and connected very readily and simply to the automobile body, combining therewith to form a flying machine, and comprises two monoplane wings 100 integrally formed to extend to either side of the vehicle body. Extending rearwardly from either wing and spaced from the center of the unit are twin parallel booms 101 for integrally connecting and supporting the tail surfaces from the wing. Said tail surfaces comprise a fixed horizontal stabilizer surface 102 with a pivotally connected elevator 103 extending from the rear edge thereof. Centrally disposed between the booms is a fixed vertical fin or stabilizer 104, with a vertical rudder 105 hinged to the rear edge of the fixed fin 104. Suitable ailerons 107 are pivotally connected to form part of the trailing edge of the wings 100 in the conventional manner. The detailed construction of the wing and tail members constitutes no essential part of the invention and may be varied as required in practice. For example, the booms 101 and the tail surfaces may in some instances be dispensed with entirely and vertical rudders mounted at either end of the wing surfaces, although the construction shown is preferable for stability and conventional flying practice.

In accordance with the invention, means are provided for supporting the flight unit on the body of the car, said support being readily and simply demountable but very secure and strong so as to insure complete stability and strength. Accordingly the flight unit is adapted to be seated upon and directly fastened to the rigid structural frame of the car. The top surface of the car body is provided with two horizontal transverse grooves 110 and 111 at the bottom of which are exposed structural cross spars 112 of the car body, said spars being supported at the tops of the vertical columns 113 which are directly connected to the car chassis and thus act to support and distribute weight directly to the main weight-supporting framework of the car. The internal framework of the wing structure 100 comprises two transverse beams 115 and 116, substantially I-beams in cross section, and tapered outwardly from their centers to provide cantilever supports lengthwise of the wing. Said beams 115 and 116 are adapted to fit into the grooves 110 and 111 respectively, where they rest and are supported upon the car frame struts 112. For permitting suitable seating and contouring of the wing structure on top of the car body, the under surface 117 of the wing is cut away at 118 and 119 to fit on and accommodate the top of the car between the grooves 110 and 111, said cutaway portion extending for the width of the top of the car body.

Figure 3:
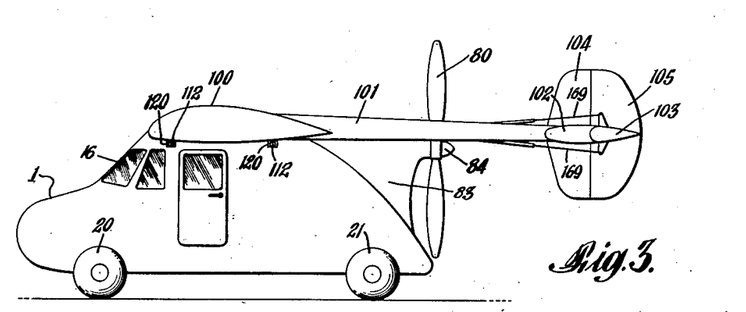
Fig. 3 is a side elevation of the motor car with flight unit and propeller attached and in position for flight.
Figure 11:
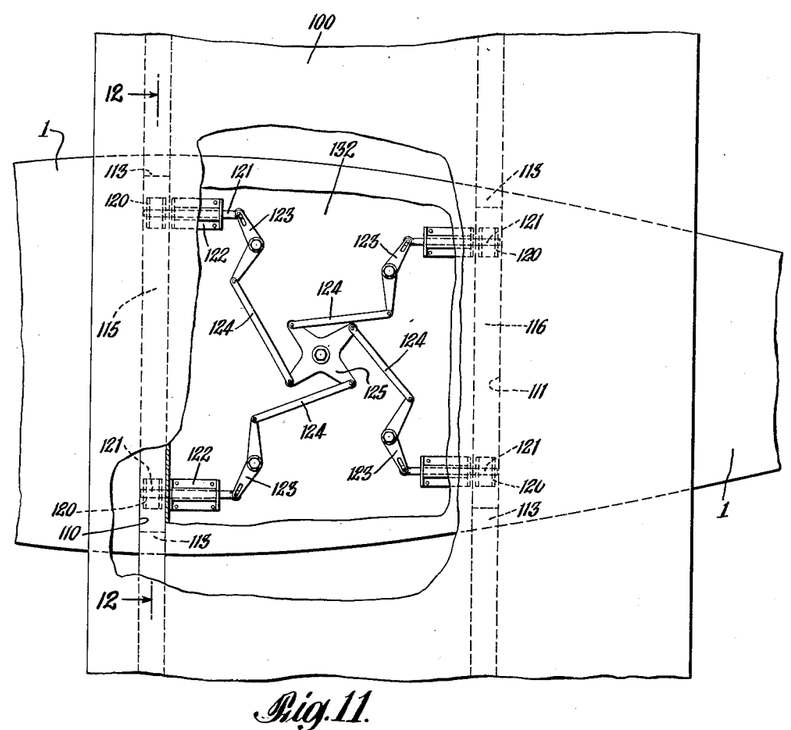
Fig. 11 is a fragmentary top plan of the flight unit in place on the car body with parts broken away to show attachment means.
Figure 12:
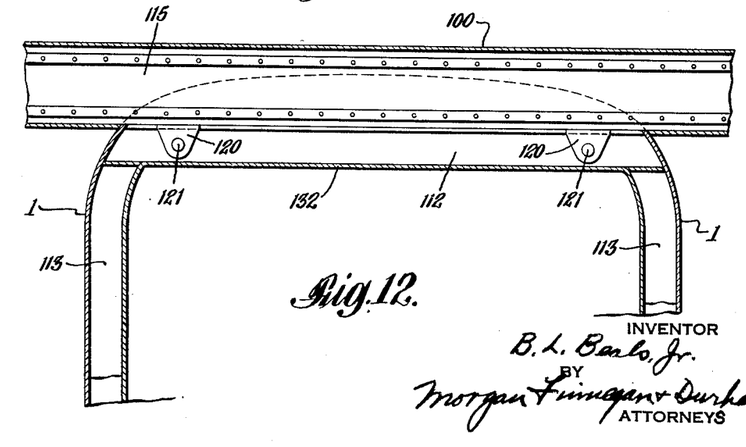
Fig. 12 is a vertical section on line 12—12 of Fig. 11.
Figure 13:
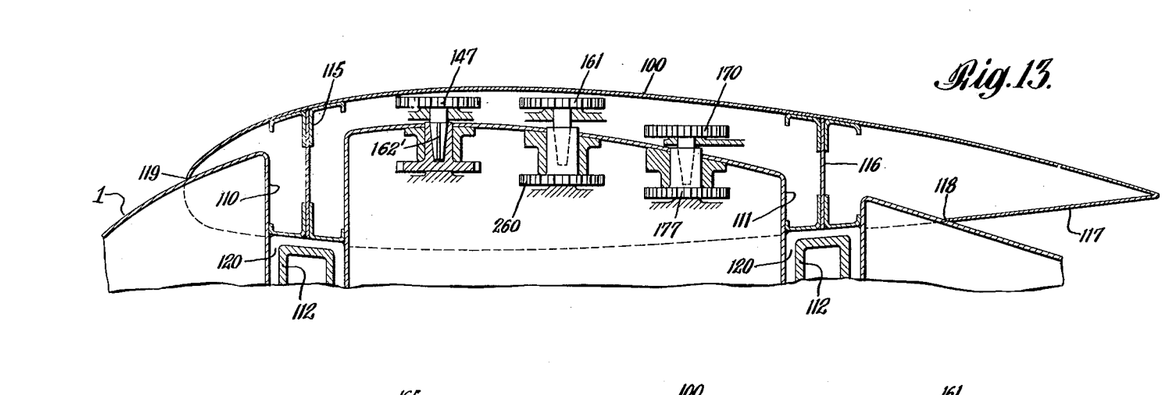
Fig. 13 is a longitudinal vertical section on line 13—13 of Fig. 10.

For fastening the wing beams 115 and 116 to the car struts 112 a simple multiple-bolt fastening is provided whereby the entire operation of securing the wing to the car may be done in one operation. As embodied, the wing beams are provided with two sets of spaced-apart U-shaped lugs 120 which depend from the surfaces of the beams and embrace the square struts 112. The lugs 120 and the struts 112 are conformably apertured to receive bolts or other fastening means adapted to pass therethrough. In the simplest form of fastening, bolts may be driven through the apertures or pass therethrough and fixed in place by lock nuts. However, the invention preferably provides means for simultaneously accomplishing fastening of all four sets of lugs, as shown in Fig. 11. Bolts 121 are slidably mounted within the wing by brackets 122 and the inner ends of the bolts are connected to bell crank levers 123 which at their opposite ends have toggle connection, through links 124, with a star shaped actuating disc 125. The disc 125 is rotatable on a vertical axis at the center of the wing and is adapted to be actuated from the interior of the car body to seat and unseat the bolts. A suitable crank or other actuating handle (not shown) operable from within the car may be provided for this purpose. Suitable means, not shown, may be provided for locking the disc in the fastened position. Thus the entire flight unit, comprising the wings 100 and the attached tail surfaces, may be quickly seated on top of the car and fastened in place by a single fastening operation. The vehicle with the flight unit and propeller in position for flight is shown in Fig. 3 and it will be noted that the combined elements form a monoplane of high wing construction and having a pusher propeller between the booms 101 of the flight unit.

Figure 15:
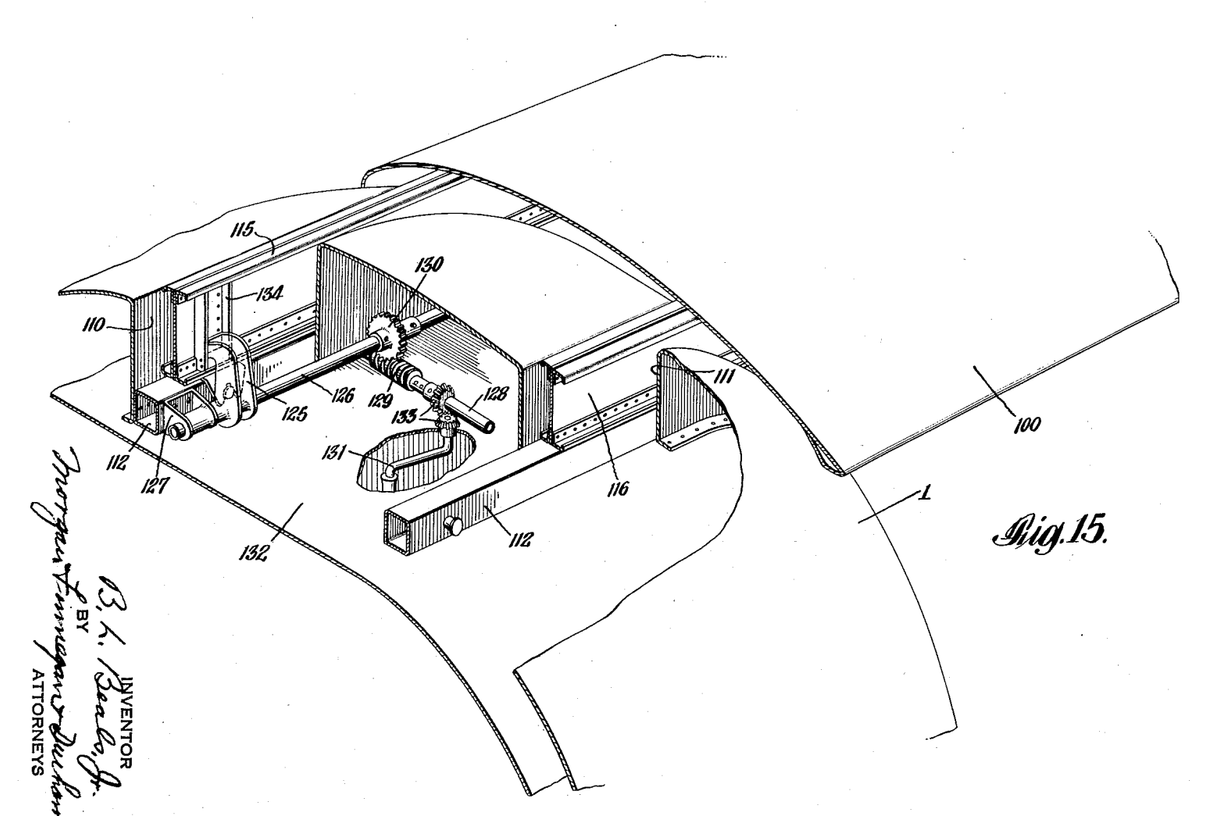
Fig. 15 is a fragmentary perspective of a modified form of attachment of the flight unit to the car body.

A modified form of means for fastening the flight unit to the top of the car is shown in Fig. 15. As embodied, the space in the car top between the grooves 110 and 111 is provided with means operable from inside the car to clamp the wing beams 115 and 116 to the car body struts 112. As shown a clamping hook 125 is fixed to rotate with the transverse shaft 126 housed within the top of the car body. The shaft 126 is rotatably supported on one side of the strut 112 by a suitable bracket 127. Means for rotating shaft 126 to rock the hook 125 into and out of clamping position with respect to beam 115 comprise a transverse shaft 128 having thereon a worm wheel 129 engageable with a spur gear 130 on the shaft 126. A crank 131 movable from within the car body projects through the inner roof surface 132 of the car and rotatably engages the shaft 128 through bevel gearing 133. The upper end of the hook 125 is adapted to engage a suitable opening or recess in the beam 115 between side guiding members 134. It will be understood that the shaft 126 will be provided with two or more hooks spaced apart to engage the beam 115 at different places and that a similar parallel shaft with equivalent hooks will be provided to similarly connect the beam 116 to the corresponding car strut 112. Thus a single operation of the crank 131 will effect locking or unlocking of the flight unit to the car body.

Referring now to the embodied means for controlling the vehicle in flight, the controlling devices for operating the automobile on land are largely adapted to be connected with the flight-controlling elements and disconnected from their automobile controlling functions so that they serve a dual role in the control of the vehicle. Thus the steering mechanism of the automobile is adapted to be utilized for controlling the operation of the wing ailerons and the elevator 103, while the vertical rudder 105 is connected to be operated by manipulation of the clutch and brake pedals 55 and 70 of the automobile.

Figure 7:
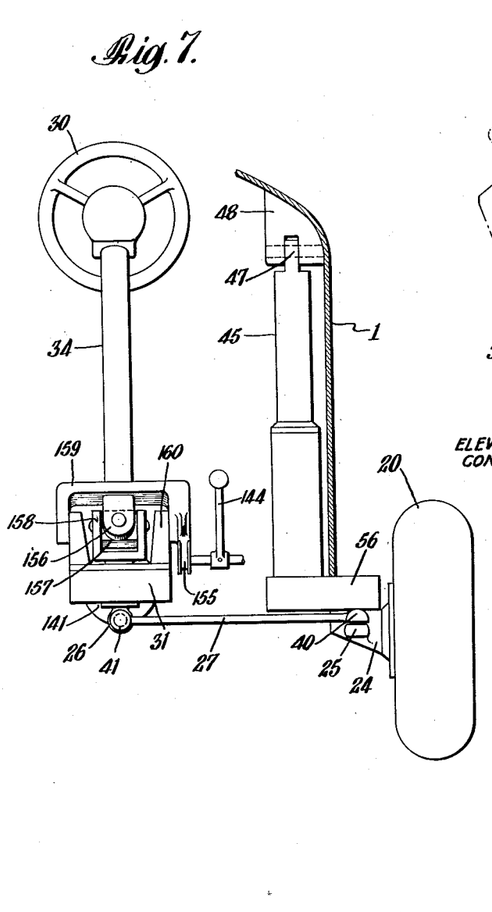
Fig. 7 is a detail elevation of the front wheel mechanism and shock absorbing unit for the left front wheel.

The front wheel steering mechanism is adapted to be disconnected from the front wheel control and connected to operate the wing ailerons 107. As shown in Figs. 7 and 8 the wheel steering connection between the steering shaft 32 and the crank 26 is effected through a positive clutch (not shown) in the gearing box 31. One possible form of such clutch is shown and described hereinafter in connection with Fig. 19. An aileron-cable pulley or quadrant 141 is rotatably mounted on a shaft 140 and is provided with a clutching face 142 adapted to be engaged by corresponding clutch teeth 143 splined on the shaft 140. Shaft 140 is rotatably connected to steering shaft 32 by suitable gearing, not shown. Thus when the handle 144 is rocked to the right in Fig. 8, the clutch members 142 and 143 will engage so that motion of the steering shaft 132 will be transmitted to the pulley 141. Simultaneously the shaft 32 will be disengaged from the steering crank 26 and the dirigible wheels 20 will be locked in the straight forward position.

The pulley 141 is connected by suitable cables or the like (not shown) to the control means for the ailerons 107. The latter comprise pulleys 147 and 148 actuated by a continuous belt or wire 149. The pulley 148 has suitable rotatable engagement with a wire and pulley system 150 which is directly connected to rock the aileron 107 by control wires 151. It will be understood that the above-described aileron actuating and control means is conventional and the description and showing thereof largely diagrammatic, as said control means mounted in the wing in itself constitutes no essential part of the invention. From the foregoing it will be understood that turning of the steering wheel 30 will cause a corresponding directional turning of the pulley 141 and thereby control the movement and positioning of the ailerons 107, exactly as is done in modern aircraft using steering control for ailerons.

The wheel steering mechanism is also designed to permit control of the elevator surface 103 of the flight unit. As embodied, an elevator control quadrant 155 is attached to the bottom of the steering column 34 and said quadrant is adapted to control the operation of flexible wires or the like (not shown) which lead to the elevator control mechanism in the wing hereinafter described. When the steering column is locked in wheel steering position by means of the removable locking means 35, 36 and 37, the elevator control quadrant 155 is rigidly held in idle position. However, the invention provides means for freeing the steering column for a limited fore-and-aft rocking movement to effect actuation of the elevator quadrant for flight control. As embodied, the steering column 32 is forked at its lower end 156 and there engages a rotatable block 157 which is pivotally mounted in a U-shaped bracket 158. The elevator quadrant 155 is formed on one face of a U-shaped frame 159 which is apertured to embrace the lower end of the column 32 and is trunnioned to rock about the upstanding ends of an internally disposed U-shaped bracket 160. Thus when the connection 36 between the steering column 34 and the fixed member 37 is released, the steering column is free to rock fore-and-aft within the limits shown in Fig. 8, thereby to correspondingly oscillate the quadrant 155.

Oscillatory motion is transmitted by any suitable means, such as a wire or chain (not shown) to a sprocket wheel 260 mounted in the top of the car body between the grooves 110 and 111. Means are provided for transmitting the motion of the sprocket wheel 260 to the elevator control means in the flight unit when the latter is mounted in place on top of the car. As embodied, the elevator-controlling sprocket wheel 161 in the wing is provided with a downwardly disposed tapered shaft 162 which is adapted to seat within a conforming socket 163 on the shaft of the sprocket wheel 260. The tapered shaft 162 is splined at 162' to conform with suitable recesses in the socketed shaft 163, whereby the sprocket wheels 260 and 161 are removably connected and designed to rotate together. The interior sprockets 260 may be supported from the car roof in any suitable way, as by bracket bushings 164.

Figure 10:
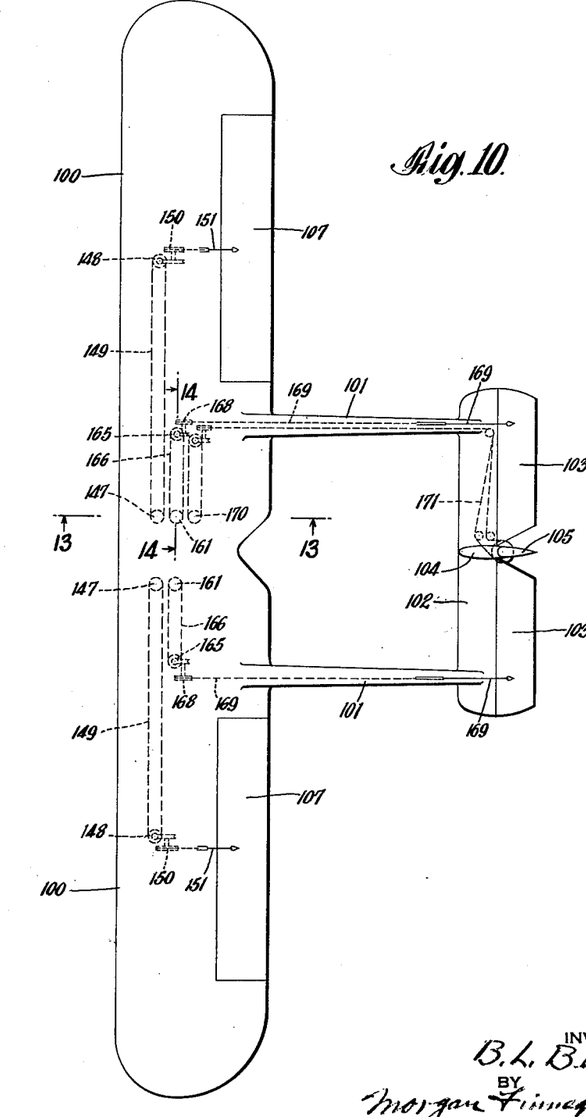
Fig. 10 is a top plan of the flight unit.
Figure 14:
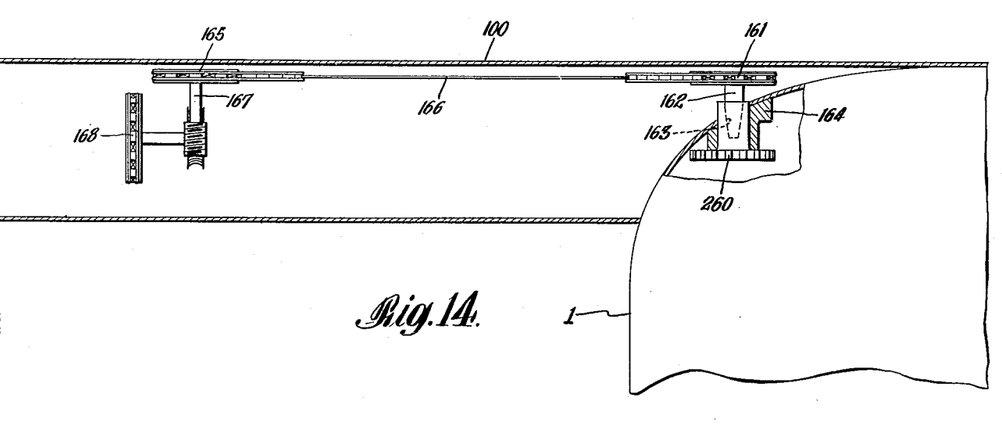
Fig. 14 is a transverse vertical section on line 14—14 of Fig. 10.

The means for transmitting the motion of sprocket 260 to the elevator surface 103 are shown in Figs. 10 and 14, where the sprocket 161 transmits its oscillatory movement to a parallel sprocket 165 through a continuous chain and cable member 166. The shaft 167 of sprocket 165 is suitably geared to a vertical sprocket 168 which is connected to control the elevator surface 103 through suitable control cables 169 in a conventional manner. It will be clear that the construction for actuating the aileron control pulley or sprocket 147 is substantially identical to that just described for the elevator sprocket 161. A similar sprocket 170 is also positioned in the wing for actuating similar control cables 171 conventionally shown in Fig. 10.

Figure 9:
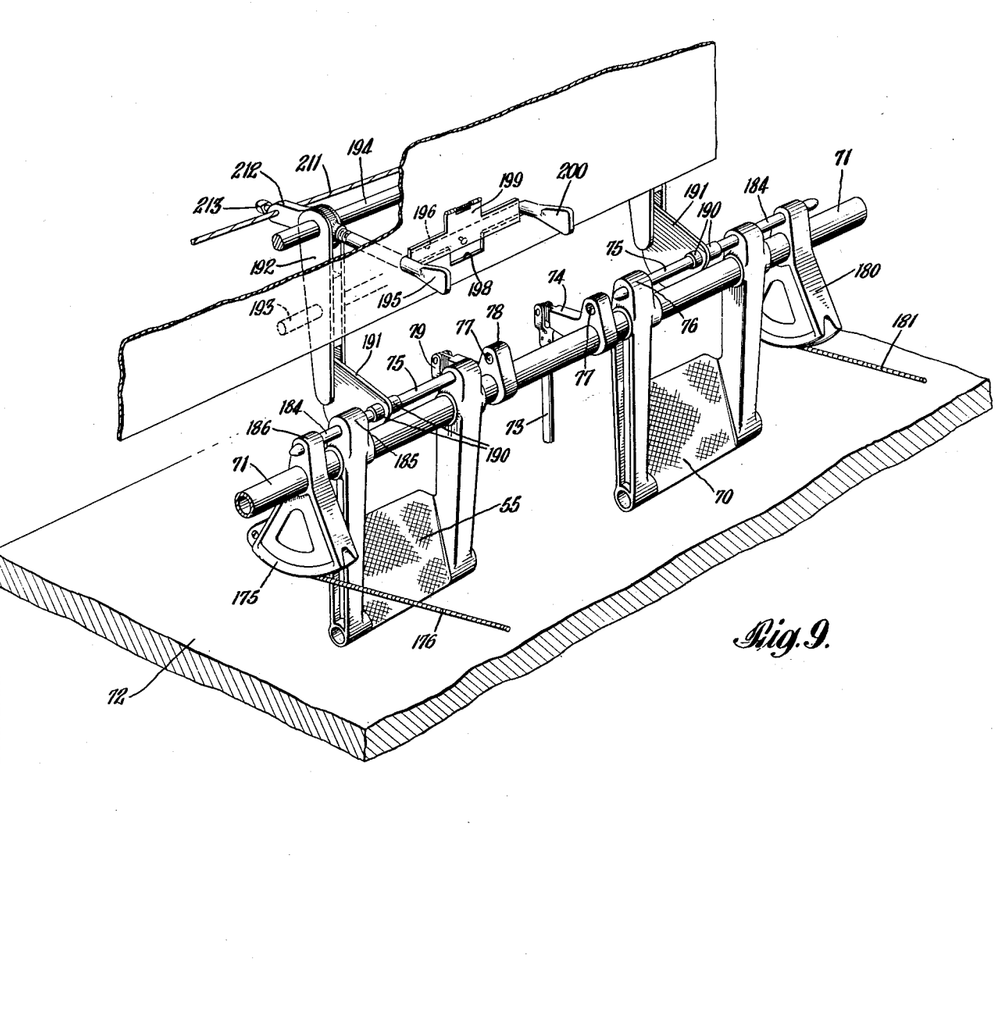
Fig. 9 is a fragmentary perspective of the combined clutch brake and rudder control mechanism.

The clutch pedal 55 and the brake pedal 70 are together designed to function as controlling and operating means for the vertical rudder and when so used are adapted to be disconnected from the connections for controlling the clutch and brake respectively of the automobile. As shown in Fig. 9, the clutch pedal 55 is adapted to actuate a quadrant 175 for moving a control cable 176, which cable is connected, by passageways not shown, to operate the sprocket 177 and thereby to turn the rudder controlling sprocket 170 in one direction. Opposite directional movement is imparted to the rudder sprocket 170 by a similar quadrant 180 and control cable 181 designed to be actuated by the brake pedal 70. The quadrant 175 is rotatably mounted on the supporting shaft 71 and is connectable to rotate with the clutch pedal 55 by means of a slidable pin 184 which is movable to the apertured arm 185 of the clutch pedal above shaft 71 and into conforming aperture on the similar arm 186 of the quadrant 175. Substantially identical means are provided for similarly connecting the brake pedal 70 to the other rudder quadrant 180 as will be clear from Fig. 9.

Means are provided whereby the driver may selectively engage the clutch pedal 55 with either the clutch-operating linkage or the rudder control quadrant 175, depending upon whether the vehicle is to be operated on land or in flight, and similar means are provided for controlling the relation of the brake pedal 70 to the wheel brakes and the rudder quadrant 180. As embodied, the clutch pedal connecting pin 75 extends at 184 toward the quadrant 175. Spaced collars 190 on the pin 75—184 engage between them an actuating plate 191 through which the pin passes. Means for imparting translational movement to the plate 191 to slide pins 184 and 75 horizontally to engage either the rudder quadrant 175, as shown, or the clutch controlling lever 78 comprise a forked arm 192 which engages the plate 191 at its lower end and is horizontally slidable on supporting rods 193 and 194. A handle 195 for shifting the arm 192 is rotatably mounted on shaft 194 between the upper ends of the forked arm 192. The rear end of the handle 195 projects through a horizontal slot 196 in the dashboard of the car and is slidable from the left hand of said slot to the center thereof, where it may drop into a retaining notch 198, as shown in Fig. 9. A spring-controlled guard plate 199 normally causes the handle 195 to remain at the end of the slot and must be lifted to permit shifting of the handle toward the notch. It will be clear that the control handle 200 is designed to operate connections for the brake pedal 70 between the brake-controlling rod 73 and the rudder quadrant 180 in a similar manner.

The invention further contemplates the provision of safety interlock devices whereby the vehicle will be fully capacitated to operate in the intended medium before it can be started in operation. Certain illustrative and exemplary interlock devices are shown and described, but it will be understood that the invention is not confined thereto as it is intended to cover broadly any suitable or desirable means for this broadly defined function.

As an illustrative embodiment of such interlocking means, the invention comprises means for preventing operation of the propeller 80 unless and until the rudder control pedals 55 and 70 are linked to the quadrants 175 and 180 respectively. As embodied, the clutch disc 94 which is selectively engageable with the automobile friction clutch 91 and the propeller drive pulley 88 is positionable along shaft 11 by means controlled through the operation of the linkage between the rudder pedals and their rudder controlling quadrants. A forked lever 210 rotatably engages the clutch disc 94 and at its outer end is fixed to an endless control wire 211 which passes about suitable pulleys between the clutch mechanism and the dashboard control. Means for imparting movement to the endless cable 211 from the rudder pedal linkage comprises an arm 212 extending forwardly from the shaft 194 and forming an integral extension of the shiftable handle 195. The arm 212 is made fast to the control cable 211 by suitable means, such as a binding screw 213. Thus the movement of control handle 195 from the position shown in Fig. 9 to that shown in Fig. 16 will cause the clutch disc 94 to move to the rear and thus engage shaft 11 for driving the automobile wheels. Movement of the control handle 195 into the position shown in Fig. 9 will cause a reverse movement of clutch disc 94 to engage the motor shaft with the propeller shaft pulley 88. Consequently the propeller 80 will be driven from the motor 10 only when the rudder controls are connected for flight operation.

Similar interlock connections (not shown) may be provided between the other controlling elements of the vehicle. For example, the shaft 140 for shifting the control of the steering wheel 30 from the vehicle wheels 21 to the aileron control and vice versa, may be interlocked with the handle 131 or member 125, the movement of which locks the flight unit in position on the car body. Thus by an interlocking cable control, such as that shown in Fig. 16, or by other suitable means, the steering wheel may be prevented from operating the aileron control mechanism unless and until the flight unit is in position. A similar interlock may be provided if desired between the releasable means 36 for fixing the steering column in wheel steering position, and the seating of the pulleys 147, 161 and 170, or any of them, in the sockets 163. In this manner the steering column can be prevented from taking up its fore-and-aft movement unless and until the elevator controls are in operative connection with the actuating means on the car.

Referring again to the utilization of the automobile steering wheel and column for operating the ailerons, instead of using the steering wheel 30, the steering column 32 may be freed for lateral movement, as well as fore-and-aft movement, to operate similarly to the conventional "joy-stick." When such universal rocking movement is utilized for the steering column, the steering wheel will preferably be locked against turning movement.

It will further be understood that the invention is not limited to the specific linkages between the flight control surfaces on the flight unit and the controlling devices of the motor car. For example the vertical rudder 105 may be controlled by the turning movement of the steering movement 30 and the ailerons 107 connected to the clutch and brake pedals 55 and 70. Alternatively the fore-and-aft movement of the steering column 34 may be linked to control either the ailerons or the vertical rudder instead of the elevator 103, it being obvious that a simple interchange of the cable connections between any of these devices is sufficient to make the desired combination of linkages.

Figures 17, 18, 19:
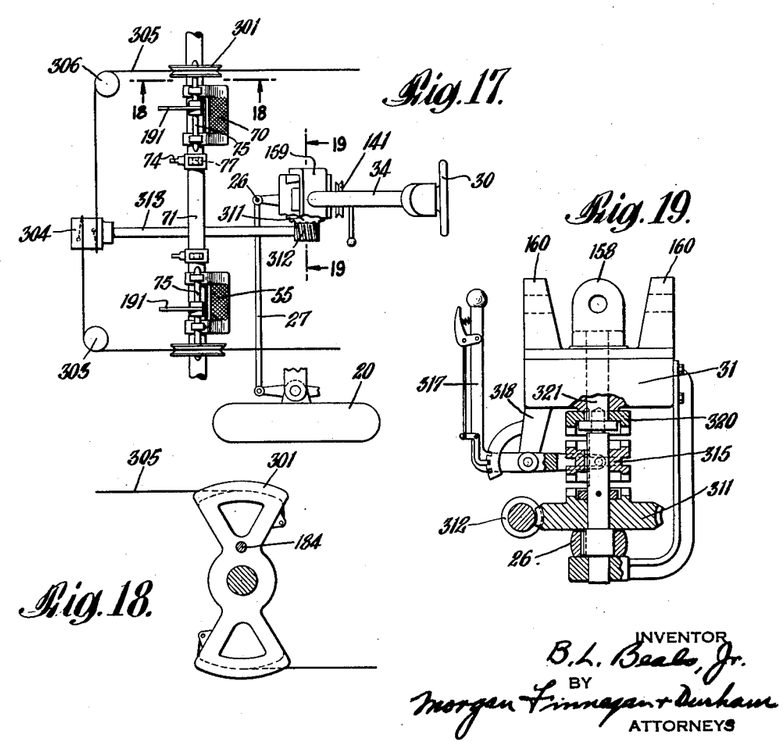
Fig. 17 is a fragmentary plan view of a modified mechanism whereby the front wheels and rudder may be controlled together.
Fig. 18 is a vertical section on line 18—18 of Fig. 17.
Fig. 19 is a vertical section on line 19—19 of Fig. 17.

The invention further comprises means for temporarily steering the front wheels of the automobile while the vehicle is still conditioned for flight operation. Such provision is desirable particularly for guiding the vehicle during landing, when it is still necessary to operate the ailerons and rudder controls of the flight unit, but may also be helpful to steer the vehicle during its taxiing movements by use of the dirigible wheels 20 as well. An embodiment of mechanism for this purpose is illustrated in Figs. 17, 18 and 19, where, as shown, the rudder controlling pedals 55 and 70 are adapted to be connected to steer the front wheels 20 while still controlling the rudder. As embodied, the rudder control quadrants 175 and 180 are provided with integrally formed quadrants 300 and 301 respectively projecting above the shaft 71. Control cable 302 is fastened to quadrant 300 and passes around pulley 303 to be fixed on the surface of a drum 304. Similarly control cable 305 extends from quadrant 301 around pulley 306 and is fixed to drum 304 in the opposite sense. Consequently any control movement of the rudder pedals will cause the drum 304 to rotate in the same sense as the rudder.

Means are provided for selectively linking the drum 304 to the steering mechanism for the dirigible wheels 20. As embodied, the steering crank 26 is operatively connected to an extension shaft 310 projecting from the steering mechanism 31. A worm gear 311 is loosely mounted on shaft 310 and meshes with a worm 312 formed on shaft 313. Shaft 313 is fixed to rotate with drum 304 so that ordinarily in flight operation the rotary movement of drum 304 is idly transmitted to the loose worm gear 311. Means are provided for selectively transmitting the motion of worm gear 311 to the steering crank 26, said means comprising a toothed clutch member 315 which is splined to shaft 310 and may be slidably engaged with a conforming clutch face 316 on the upper surface of worm gear 311. A suitable clutch-controlling lever 317 may be mounted on a bracket 318 fixed to the steering gear box 31 for controlling the positioning of the clutch 315.

The clutch 315 has three positions, that shown in Fig. 19 being its lowermost. At the intermediate or neutral position the worm gear 311 rotates idly on the shaft 310 and the shaft 310 and steering crank 26 are likewise disconnected from the steering shaft 32, so that movement of the steering wheel 30 may be used to operate the ailerons through clutch 143 as hereinbefore described. In its uppermost position, the upper face of clutch member 315 is adapted to engage a clutch face 320 fixed to the lower end of shaft 321. Shaft 321 constitutes an extension of the steering shaft bracket 158 and is thereby adapted to transmit movement of the steering shaft 32 to the shaft 310 and thence to the crank 26.

The invention in its broader aspects is not limited to the specific mechanisms shown and described but departures may be made therefrom within the scope of the accompanying claims without departing from the principles of the invention and without sacrificing its chief advantages.

What I claim is:

1. An automotive vehicle having a body, a motor, supporting wheels, transmission and steering gear primarily adapted for land travel, a flight unit attachable thereto for supporting and guiding said vehicle through the air, including a vertical rudder, a clutch pedal and a brake pedal for controlling the vehicle during land travel, means for disconnecting said pedals from clutch and brake actuating means respectively, and means for connecting said pedals to control the vertical rudder in flight.

2. An automotive vehicle having a body, a motor, supporting wheels, transmission and steering gear primarily adapted for land travel, a flight unit attachable thereto for supporting and guiding said vehicle through the air, including a movable flight-controlling surface, a clutch pedal and brake pedal for controlling the vehicle during land travel, means for disconnecting said pedals from clutch and brake actuating means respectively, and means for connecting said pedals to control said movable surface in flight.

3. An automotive vehicle having a body, a motor, supporting wheels, transmission and steering gear primarily adapted for land travel, a flight unit attachable thereto for supporting and guiding said vehicle through the air, including a movable flight-controlling surface, pedals for controlling the vehicle during land travel, means for disconnecting said pedals from clutch and brake actuating means respectively, and means for connecting said pedals to control said movable surface in flight.

4. An automotive vehicle having a body, a motor, supporting wheels, transmission and steering gear primarily adapted for land travel, a flight unit attachable thereto for supporting and guiding said vehicle through the air, including a movable flight-controlling surface, pedals for controlling the vehicle during land travel, means for connecting said pedals to control said movable surface in flight and means controlled by the connections of said pedals to regulate transmission of power for land or air travel of the vehicle.

5. An automotive vehicle having a body, motor, supporting wheels, transmission and steering gear adapted for land travel, a flight unit attachable thereto for supporting, guiding and propelling said vehicle through the air, control devices for governing the operation of the vehicle on the land, means for disconnecting said control devices for land travel and connecting them to control the operation of the flight unit and means for preventing operative connection of said control devices to the flight unit until said unit is in position for flight.

6. An automotive vehicle having a body, motor, supporting wheels, transmission and steering gear adapted for land travel, a flight unit attachable thereto for supporting, guiding and propelling said vehicle through the air, control devices for governing the operation of the vehicle on the land, means for disconnecting said control devices for land travel and connecting them to control the operation of the flight unit, means for preventing operative connection of said control devices to the flight unit until said unit is in position for flight, means for connecting the vehicle motor to propel the vehicle through the air, and means for preventing said connecting operation until said control devices are connected to the flight unit.

7. An automotive vehicle having a body, motor, supporting wheels, transmission and steering gear adapted for land travel, a flight unit attachable thereto for supporting, guiding and propelling said vehicle through the air including a propeller adapted to be driven by the vehicle motor, clutch means for connecting said motor to either the propeller or the vehicle wheels, control devices for governing the operation of the vehicle on the land, means for disconnecting said control devices for land travel and connecting them to control the operation of the flight unit and means for interlocking the position of said clutch with the connections of said control devices.

8. An automotive vehicle having a body, motor, supporting wheels, transmission and steering gear primarily adapted for land travel, means attachable thereto for supporting, guiding and propelling said vehicle through the air including movable flight-controlling surfaces, said steering gear comprising dirigible wheels and a steering wheel, means for transmitting motion of the steering wheel to the dirigible wheels on the land, means for disconnecting said steering wheel from the dirigible wheels and transmitting the motion thereof to one of said flight controlling surfaces to control the vehicle in flight, and other means for controlling the dirigible wheels during flight.

9. An automotive vehicle having a body, motor, supporting wheels, transmission and steering gear primarily adapted for land travel, means attachable thereto for supporting, guiding and propelling said vehicle through the air including movable flight-controlling surfaces, said steering gear comprising dirigible wheels and a steering wheel, means for transmitting motion of the steering wheel to the dirigible wheels on the land, means for disconnecting said steering wheel from the dirigible wheels and transmitting the motion thereof to one of said flight controlling surfaces to control the vehicle in flight and other means for optionally controlling the dirigible wheels during flight.

10. An automotive vehicle having a body, a motor, supporting wheels, transmission and steering gear primarily adapted for land travel, a flight unit attachable thereto for supporting and guiding said vehicle through the air, including a vertical rudder, a clutch pedal and a brake pedal for controlling the vehicle during land travel, and means for connecting said pedals to control the vertical rudder in flight, said vehicle having dirigible wheels and means for also steering said wheels from said pedals during flight.

11. An automotive vehicle having a body, a motor, supporting wheels, transmission and steering gear primarily adapted for land travel, a flight unit attachable thereto for supporting and guiding said vehicle through the air, including a vertical rudder, a clutch pedal and a brake pedal for controlling the vehicle during land travel, means for connecting said pedals to control the vertical rudder in flight, said vehicle having dirigible wheels and means for optionally also steering said wheels from said pedals during flight.

BRUCE L. BEALS, Jr.